Patented May 3, 1932

1,856,690

UNITED STATES PATENT OFFICE

THOMAS S. CARSWELL, OF KIRKWOOD, MISSOURI, ASSIGNOR TO MONSANTO CHEMICAL WORKS, OF ST. LOUIS, MISSOURI, A CORPORATION OF MISSOURI

MANUFACTURE OF POLYHYDROXY PHENOLS

No Drawing.   Application filed May 6, 1931. Serial No. 535,575.

This invention relates to the manufacture of polyhydroxy phenols, and it has particular application to the separation and purification of aqueous solutions thereof.

Polyhydroxy phenols may be synthesized or recovered from naturally occurring organic products by various well known methods. In general, the product is obtained in the crude form as an aqueous solution. Inasmuch as the polyhydroxy phenols are relatively sensitive and highly reactive compositions, their isolation and purification present certain difficulties.

The object of this invention is to provide a novel method of separating polyhydroxy phenols from aqueous solutions thereof whereby a substantially complete recovery of the product is obtained directly, from water and inorganic impurities with which the crude product may be associated.

According to this invention an aqueous solution of the crude phenol is extracted with isopropyl ether in a manner analogous to other well known extraction processes. The temperature of extraction may vary widely; temperatures of 20°–50° C. have been satisfactory. The ether being insoluble in water rises to the surface of the aqueous layer and is separated by a suitable decanting or separatory device. Thorough intermixing of the ether with the aqueous solution is desirable in order that an equilibrium between the phenol contained in the aqueous layer and that in the ether layer is attained. Upon separation of the ether, additional ether is added to remove the remaining traces of phenol. The product so recovered may be employed directly in other syntheses.

In lieu of a batch type of extraction, a continuous extraction may be adopted whereby the ether is added continuously to a charge of the aqueous phenol solution, and thoroughly mixed therewith before rising to the surface of the aqueous layer, from which it is separated. Alternatively, one may employ a counter-current extraction wherein the ether is supplied continuously at the base of a tower filled with the aqueous phenolic solution and permit the same to rise through the tower. The ether so added is removed continuously from the top of the tower. The fresh aqueous solution is introduced near the top of the tower, allowed to move downwardly and finally is withdrawn from the base of the tower after having been stripped of all of the phenol present.

The invention is applicable to the many polyhydroxy phenols, notably, catechol, resorcinal, hydroquinone, pyrogallol, etc. Isopropyl ether has been found to be peculiarly adapted to the extraction of these products inasmuch as it is liquid at convenient operating temperatures; yet, it has a low boiling point and may be separated from the polyhydroxy phenol product by evaporation without danger of decomposition of the product. Moreover, the boiling point of the ether is sufficiently high to avoid substantially, volatilization and evaporation losses. Furthermore, isopropyl ether is stable, neutral, chemically inert under the condition of operation, offers no corrosion problems, possesses a low latent heat of vaporization, and is readily available on the market.

Although the source of the aqueous solution of a polyhydroxy phenol forms no part of the present invention, one method by which an aqueous solution of a polyhydroxy phenol may be obtained consists in heating an orthochlor phenol with aqueous caustic soda, preferably under super-atmospheric pressure. Details of the process are well known to those skilled in the art. Upon completion of the causticization, the charge is steam distilled to remove any unreacted orthochlor phenol and subsequently is neutralized to liberate the orthodihydroxy benzene (catechol). The neutral aqueous solution so obtained containing the catechol is extracted with isopropyl ether, from which a pure catechol product may be crystallized by evaporation of the solvent.

From the description hereinabove set forth, it will be apparent that the specific manner of using isopropyl ether in the separation of polyhydroxy phenols from aqueous solutions thereof is susceptible to many modifications. It will likewise be apparent that the principles of my invention may be adapted to other modifications without departing from the spirit of the invention, and I desire, therefore, that it be limited only as indicated in the appended claims.

What I claim is:

1. The method of separating a polyhydroxy phenol from an aqueous solution thereof which comprises causing isopropyl ether to contact with the aqueous solution and subsequently separating the ether from the aqueous solution.

2. The method of separating catechol from an aqueous solution thereof which comprises mixing isopropyl ether with the aqueous solution and separating the ether from the aqueous solution.

In testimony whereof, I affix my signature.

THOMAS S. CARSWELL.